US 9,665,985 B2

(12) United States Patent
Mullins et al.

(10) Patent No.: US 9,665,985 B2
(45) Date of Patent: May 30, 2017

(54) REMOTE EXPERT SYSTEM

(71) Applicant: DAQRI, LLC, Los Angeles, CA (US)

(72) Inventors: Brian Mullins, Sierra Madre, CA (US); Matthew Kammerait, West Hollywood, CA (US); Christopher Broaddus, Mountain View, CA (US)

(73) Assignee: DAQRI, LLC, Los Angeles, CA (US)

( * ) Notice: Subject to any disclaimer, the term of this patent is extended or adjusted under 35 U.S.C. 154(b) by 100 days.

(21) Appl. No.: 14/461,252

(22) Filed: Aug. 15, 2014

(65) Prior Publication Data

US 2016/0049004 A1    Feb. 18, 2016

(51) Int. Cl.
*G06F 3/14*     (2006.01)
*G06T 15/00*    (2011.01)
*G06T 19/00*    (2011.01)
*G09G 3/00*     (2006.01)

(52) U.S. Cl.
CPC .......... *G06T 19/006* (2013.01); *G06F 3/1454* (2013.01); *G09G 3/001* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 2006/0170652 A1* | 8/2006 | Bannai | G06F 3/011 345/156 |
| 2010/0302143 A1 | 12/2010 | Spivack | |
| 2012/0122062 A1* | 5/2012 | Yang | G09B 9/00 434/219 |
| 2013/0044128 A1 | 2/2013 | Liu et al. | |
| 2013/0083063 A1* | 4/2013 | Geisner | G06T 19/006 345/633 |
| 2014/0111547 A1 | 4/2014 | Bilbrey et al. | |

FOREIGN PATENT DOCUMENTS

WO    WO-2016025691 A1    2/2016

OTHER PUBLICATIONS

"International Application Serial No. PCT/US2015/045018, International Search Report mailed Nov. 9, 2015", 2 pgs.
"International Application Serial No. PCT/US2015/045018, Written Opinion mailed Nov. 9, 2015", 9 pgs.
"International Application Serial No. PCT/US2015/045018, International Preliminary Report on Patentability mailed Aug. 30, 2016", 20 pgs.

* cited by examiner

*Primary Examiner* — Yingchun He
(74) *Attorney, Agent, or Firm* — Schwegman Lundberg & Woessner, P.A.

(57) ABSTRACT

A remote expert application identifies a manipulation of virtual objects displayed in a first wearable device. The virtual objects are rendered based a physical object viewed with a second wearable device. A manipulation of the virtual objects is received from the first wearable device. A visualization of the manipulation of the virtual objects is generated for a display of the second wearable device. The visualization of the manipulation of the virtual objects is communicated to the second wearable device.

17 Claims, 8 Drawing Sheets

REMOTE EXPERT SYSTEM

TECHNICAL FIELD

The subject matter disclosed herein generally relates to the processing of data. Specifically, the present disclosure addresses systems and methods for generating a remote expert system using a dynamic survey of components in relation to a virtual model.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision, object recognition, and other complementary technologies), the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
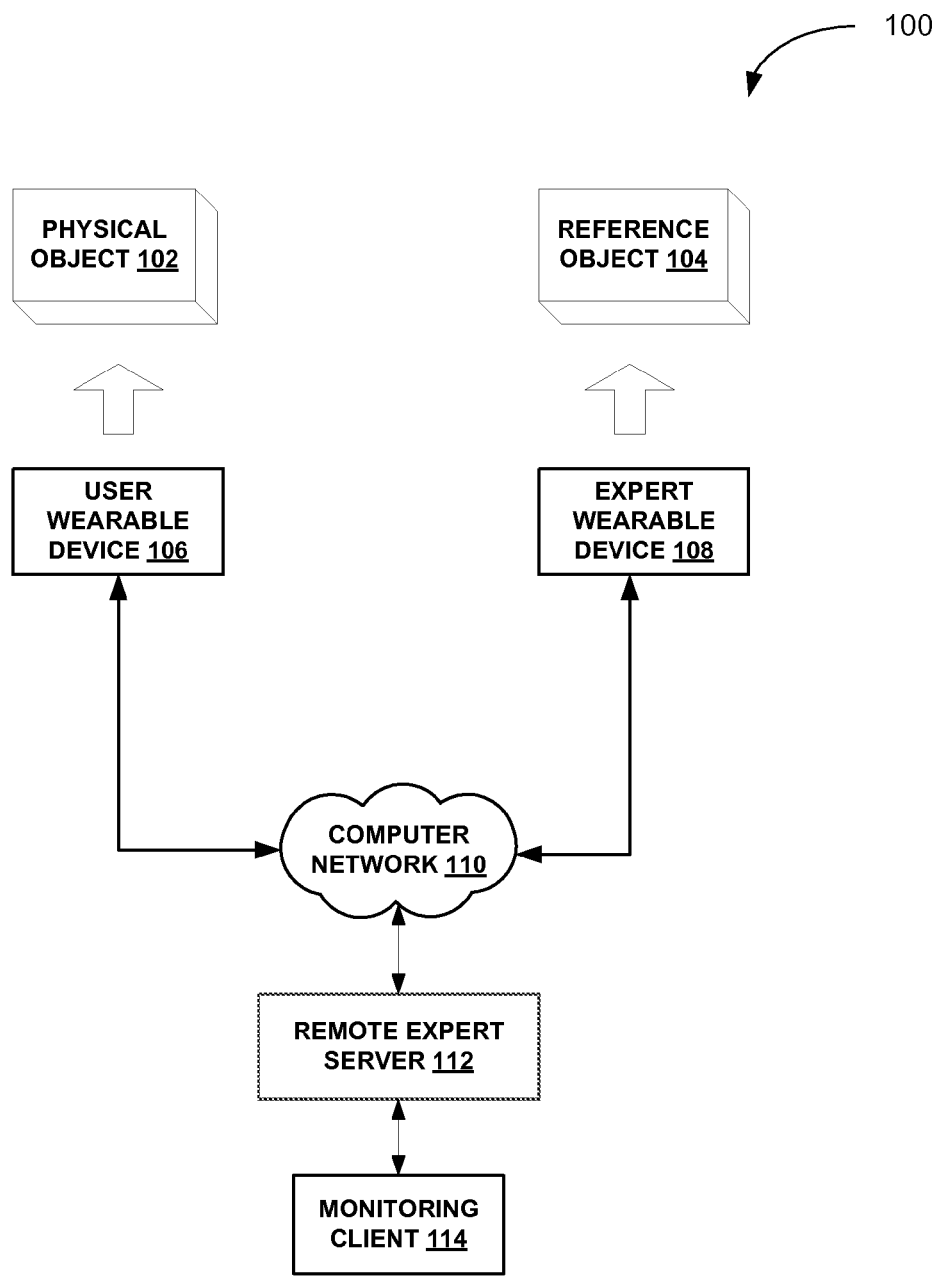
FIG. 1 is a block diagram illustrating an example of a network suitable for a remote expert system, according to some example embodiments.

Example methods and systems are directed to a remote expert system for augmented reality applications. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality applications allow a user to experience information, such as in the form of a three-dimensional virtual object overlaid on an image of a physical object captured by a camera of a wearable device. The physical object may include a visual reference that the augmented reality application can identify. A visualization of the additional information, such as the three-dimensional virtual object overlaid or engaged with an image of the physical object, is generated in a display of the device. The three-dimensional virtual object may selected based on the recognized visual reference or captured image of the physical object. A rendering of the visualization of the three-dimensional virtual object may be based on a position of the display relative to the visual reference. Other augmented reality applications allow a user to experience visualization of the additional information overlaid on top of a view or an image of any object in the real physical world. The virtual object may include a three-dimensional virtual object or a two-dimensional virtual object. For example, the three-dimensional virtual object may include a three-dimensional view of a chair or an animated dinosaur. The two-dimensional virtual object may include a two-dimensional view of a dialog box, a menu, or written information such as statistics information for a baseball player. An image of the virtual object may be rendered at the wearable device.

A remote expert application of a remote expert server identifies a manipulation of virtual objects displayed in a first wearable device. The virtual objects are rendered based on a physical object viewed with a second wearable device. The virtual objects are displayed in the first wearable device in relation to a reference object viewed by the first wearable device. A manipulation of the virtual objects is received from the first wearable device. A visualization of the manipulation of the virtual objects is generated for a display of the second wearable device. The visualization of the manipulation of the virtual objects is communicated to the second wearable device. A user may wear the first wearable device. An expert may wear the second wearable device. In another example, the user uses a wearable device to communicate with a mobile device (e.g., tablet) of an expert. In another example, the user may use a mobile device (e.g., tablet) to communicate with an expert having the wearable device. In another example, the mobile device (e.g., tablet) of a user may communicate with another mobile device (e.g., tablet) of an expert.

In one example embodiment, the remote expert application receives video feed, location information, and orientation information from the second wearable device. The remote expert application identifies the physical object from the video feed. The remote expert application generates a three-dimensional model of the virtual objects based on the identification of the physical object. The remote expert application communicates the three-dimensional model of the virtual objects to the second wearable device. The second wearable device renders the three-dimensional model of the virtual objects in relation to the physical object.

In another example embodiment, the remote expert application receives a request for assistance from the second wearable device. The request for assistance is related to the physical object. The remote expert application identifies a user of the first wearable device as an expert related to the physical object.

In another example embodiment, the remote expert application records the manipulation of the virtual objects from the first wearable device.

In another example embodiment, the remote expert application identifies the manipulation of the virtual objects from the first wearable device using a visual gesture module. The visual gesture module determines a focus area in a display of the first wearable device and a feature of the virtual object, and changes a state of the feature in response to the feature being in the focus area of the display of the first wearable device.

In another example embodiment, the remote expert application identifies the manipulation of the virtual objects from the first wearable device using a physical gesture module. The physical gesture module determines a physical movement of a finger of a user of the first wearable device relative to the virtual objects displayed in the first wearable device.

In another example embodiment, the visualization includes an animation of the manipulation of the virtual objects. The first wearable device is operated by an expert related to the physical object. The second wearable device is operated by a user.

In another example embodiment, the remote expert application receives the manipulation of the virtual objects from the expert of the first wearable device. The remote expert application communicates the visualization of the manipulation of the virtual objects to the user of the second wearable device. The remote expert application receives the manipulation of the virtual objects from the user of the second wearable device. The remote expert application communicates the visualization of the manipulation of the virtual objects to the expert of the first wearable device. The virtual objects may be manipulated by both the expert of the first wearable device and the user of the second wearable device.

In another example embodiment, the remote expert application receives video feeds, location information, and orientation information from a plurality of wearable devices. The remote expert application generates a three-dimensional model of the virtual objects based on the video feeds, location information, and orientation information received from the plurality of wearable devices. The wearable devices are focused on the same physical object. The remote expert application performs analytics on the video feeds/location information/orientation information to identify a manipulation of the physical object, updates the three-dimensional model of the virtual objects based on the manipulation of the physical object, and generates a dynamic status related to the manipulation of the physical object with respect to reference data related to the physical object.

Multiple wearable devices (e.g., mobile devices that include a camera and a display) looking at a same physical object from different angles and locations may be further used to generate and reconstruct a three-dimensional model of the physical object. A system and method for a survey system taking advantage of the multiple wearable devices is described. A survey application generates a survey of components associated with a three-dimensional model of the physical object. For example, the components may include nails on drywall, switches on a dashboard, buttons on a factory machine, a boat, or any industrial physical object. The survey application receives video feeds, location information, and orientation information from the wearable devices. The three-dimensional model of the object is generated based on the video feeds, location information, and orientation information received from the wearable devices. Analytics are performed on the video feeds to identify a manipulation of the object (e.g., a nail is being hammered in a wall, a switch is operated on a dashboard). The three-dimensional model of the object is updated based on the manipulation of the object. A dynamic status related to the manipulation of the object is generated with respect to reference data related to the object. A survey of components associated with the three-dimensional model of the object is generated.

In one example embodiment, the manipulation of the object comprises a modification of an existing component of the object (e.g., a switch on a wall), an addition of a new component to the object (e.g., a nail in a wall), or a removal of an existing component of the object (e.g., a handle from a door).

Object recognition is performed on the video feeds to identify a component on the object (e.g. nails on a wall). The dynamic status may include an identification of a type of manipulation or action on the object using key states or properties (e.g., unhammered nail, painted surface, gluing phase, hammering phase, etc.), an identification of a tool used in the manipulation of the object (e.g., hammer, saw, etc.), a location of the manipulation relative to the three-dimensional model of the object (e.g., nails hammered on the side panel of a boat), and an identification of the wearable device associated with the manipulation of the object (e.g., user of wearable device A is the one using the hammer).

Reference data may include a three-dimensional model of a reference object (e.g., boat, car, building), a reference process (e.g., phase 3 is to build the frame, phase 4 is to install plumbing) for completing the reference object (e.g., a house), and a reference compliance related to the reference process (e.g., there should be four brackets or braces per beam, there should be one outlet per location or drywall).

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating a remote expert server 112 in communication with wearable devices 106 and 108, according to some example embodiments. The network environment 100 includes the wearable devices 106 and 108, a monitoring client 114, and the remote expert server 112, communicatively coupled to each other via a computer network 110. The wearable devices 106 and 108, the monitoring client 114, and the remote expert server 112 may each be implemented in a computer system, in whole or in part, as described below with respect to FIGS. 8 and 9. The remote expert server 112 may be part of a network-based system. For example, the network-based system may be or include a cloud-based server system that provides additional information, such as three-dimensional models and locations of components or items relative to the three-dimensional models, to the wearable devices 106 and 108, and the monitoring client 114.

The user wearable device 106 may be worn or held by a user or an expert viewing a physical object 102. For example, the user may be a construction worker for a building. The user is not part of the network environment 100, but is associated with the corresponding wearable device 106. For example, a wearable device may be a computing device with a display, such as a head-mounted computing device with a display and a camera. The display and camera may be disposed on separate devices but may be communicatively connected. The computing device may be hand held or may be temporarily mounted on a head of the user. In one example, the display may be a screen that displays what is captured with a camera of the wearable device. In another example, the display of the device may be transparent, such as lenses of wearable computing glasses.

In other examples, the display may be a transparent display such as a windshield of a car, plane, or truck. The display may be non-transparent and wearable by the user to cover the field of vision of the user.

Each user wearable device 106 may be worn by users located at different locations around the physical object 102. For example, the physical object 102 may be a boat under construction, and each wearable device may be mounted to the helmet of a construction worker working on the boat at a shipyard. The construction workers may be located at different locations around the boat. The construction workers may thus view different parts of the boat at the same time. The construction workers may be users of an application in the corresponding wearable device that allows them to augment their view of the boat with a virtual three-dimensional model of the completed boat. For example, the application may include an augmented reality application configured to provide the construction workers with an experience triggered by parts of the boat, a two-dimensional physical object (e.g., a marking on a door), a three-dimensional physical object (e.g., a statue located on an entrance), a location (e.g., main deck, port, starboard), or any visual or non-visual references (e.g., perceived corners of walls or furniture) in the real-world physical environment. For example, a construction worker may point a camera of the corresponding wearable device to capture an image of the two-dimensional physical object. The image is tracked and recognized locally in the wearable device using a local database such as a context recognition dataset module of the augmented reality application of the wearable device. The local context recognition dataset module may include a library of virtual objects associated with real-world physical objects or references. The augmented reality application then generates additional information corresponding to the image (e.g., a three-dimensional model) and presents this additional information in a display of the wearable device in response to identifying the recognized image. If the captured image is not recognized locally at the wearable device, the wearable device downloads additional information (e.g., the three-dimensional model) corresponding to the captured image from a database of the remote expert server 112 over the computer network 110.

The user wearable device 106 may be used to capture video and images from different angles of the physical object 102. Other sensor data may be captured, such as data generated by structured light. In one example embodiment, the user wearable device 106 may broadcast a video feed of what the corresponding user is looking at to the remote expert server 112. In another example, the user wearable device 106 captures frames or images at periodic intervals and broadcasts them to the remote expert server 112. In another example, the user wearable device 106 broadcasts images at regular intervals and/or based on their geographic location relative to each other and to the physical object 102. For example, images may be captured in a sequential pattern such as clockwise or counter-clockwise around the physical object 102. Other examples include combination of image capture and video feed from other user wearable devices. The pattern of video/image capture may alternate based on the movement, location, and orientation of each wearable device. For example, if the wearable device is looking away from the physical object 102, the rate of capture may be decreased or no image may be captured. In another example, if some of the wearable devices are located closer to each other relative to the proximity between the remaining wearable devices, the wearable devices that detect that they close to each other may capture and broadcast video/images at a lower rate. Similarly, wearable devices that are relatively more distant from other wearable devices may capture and broadcast video/images at a higher rate.

The data (e.g., image data captured using a camera, location data captured using GPS or WiFi, orientation data captured using an accelerometer) received from the user wearable device 106 may be used to reconstruct and generate a three-dimensional model of the physical object 102. For example, wearable devices worn by construction workers at a shipyard may start capturing images/video as soon as they are in proximity to the boat being built or when a distance or radius threshold is crossed. Two-dimensional images from different angles and locations around the boat may be used to reconstruct a three-dimension model of the boat being built using common computer vision systems with three-dimensional object recognition algorithms. The three-dimensional reconstruction model may be generated as an automatic post-processing step or on demand as related to a new query or equation introduced into the system well after the original data capture took place.

Furthermore, the data received from the user wearable device 106 may be provided to a computer vision object recognition system for filing and identifying objects in images and video frames. In one embodiment, an object recognition system may be part of the remote expert server 112. Thus, the data from the user wearable device 106 may be used to reconstruct a three-dimensional model of the physical object 102 but also to keep a survey or an inventory of recognized objects. For example, the remote expert server 112 may keep track of how many nails have been put in a panel on the east side of the boat, who last used a hammer, when the hammer was used, and where the hammer was used. A survey system (not shown) may also be used to compare the three-dimensional model of the physical object 102 being built or worked on with the three-dimensional completed model of the physical object 102. In another example, the survey system may be used to identify or alert a user of a wearable device of a problem detected based on the data received from the wearable device and reference data. For example, the remote expert server 112 may detect that nails were hammered in a wrong location based on the reference data and notify the user of the corresponding wearable device.

The user wearable device 106 may generate a visualization of virtual objects based on the recognized physical object 102. For example, the user wearable device 106 may be looking at an air conditioning unit. Virtual objects such as components of the air conditioning unit may be rendered for viewing using the user wearable device 106. Thus, the user may be able to see different components such as three-dimensional models of a virtual cover, a virtual circuit box, and a virtual control switch floating around, on top of, or in any other predefined position relative to the physical object 102.

The user of the user wearable device 106 may attempt to fix the air conditioning unit and may require assistance from an expert in the field of air conditioning units based on the brand or type of air conditioning unit as identified by the user wearable device 106. The user of the user wearable device 106 may request the remote expert server 112 for assistance. The remote expert server 112 may identify an expert related to the physical object 102 and communicate data such as the virtual objects' models to a corresponding expert wearable device 108.

The expert wearable device 108 may thus generate a display of the virtual objects viewed by the user wearable device 106. The expert wearable device 108 may view the virtual objects in relation to a reference object 104. For example, the expert wearable device 108 may view a similar physical air conditioning unit or any other physical reference object. The three-dimensional model of the virtual objects may be viewed from different perspectives as the expert moves around the similar physical air conditioning unit or physical reference object. The expert wearable device 108 may detect the expert manipulating the virtual objects and communicate those manipulations to the remote expert server 112. For example, the expert wearable device 108 may capture the expert turning off the virtual switch and then moving the virtual cover away from the air conditioning unit.

In one example embodiment, a wearable device may offload some processes (e.g., tracking and rendering of virtual objects to be displayed in the wearable device) using the tracking sensors and computing resources of the remote expert server 112. The tracking sensors may be used to track the location and orientation of the wearable device externally without having to rely on the sensors internal to the wearable device. The tracking sensors may be used additively or as a failsafe/redundancy or for fine tuning. The tracking sensors may include optical sensors (e.g., depth-enabled 3D cameras), wireless sensors (e.g., Bluetooth, WiFi), GPS sensors, biometric sensors, and audio sensors to determine the location of the user having the wearable device, distances between the user and the tracking sensors in the physical environment (e.g., sensors placed in corners of a venue or a room), or the orientation of the wearable device to track what the user is looking at (e.g., direction at which the wearable device is pointed, wearable device pointed towards a player on a tennis court, wearable device pointed at a person in a room).

The computing resources of the remote expert server 112 may be used to determine and render virtual objects based on the tracking data (generated internally with the wearable device or externally with the tracking sensors). The augmented reality rendering is therefore performed on the remote expert server 112 and streamed back to the corresponding wearable device. Thus, the wearable device does not have to compute and render any virtual object and may display the already rendered virtual object in a display of the wearable device. For example, the augmented reality rendering may include a location of where a handle is to be installed per architectural specifications or city code.

In another embodiment, data from the tracking sensors may be used for analytics data processing at the remote expert server 112 for analysis of how the user is interacting with the physical environment. For example, the analytics data may track at what locations (e.g., points or features) on the physical or virtual object the user has looked, how long the user has looked at each location on the physical or virtual object, how the user held the wearable device when looking at the physical or virtual object, which features of the virtual object the user interacted with (e.g., whether a user tapped on a link in the virtual object), and any suitable combination thereof. The user wearable device 106 receives a visualization content dataset related to the analytics data. The user wearable device 106 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 8 and 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The computer network 110 may be any network that enables communication between or among machines (e.g., the remote expert server 112), databases, and wearable devices. Accordingly, the computer network 110 may be a wired network, a wireless network (e.g., a mobile or cellular network), or any suitable combination thereof. The computer network 110 may include one or more portions that constitute a private network, a public network (e.g., the Internet), or any suitable combination thereof.

Figure 2:
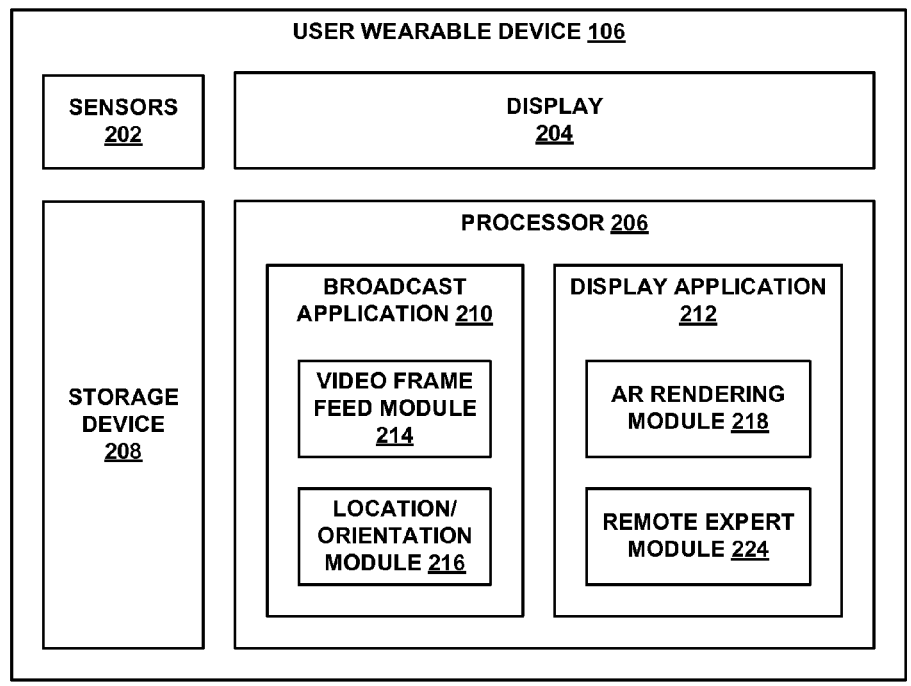
FIG. 2 is a block diagram illustrating an example embodiment of modules (e.g., components) of a user wearable device.

FIG. 2 is a block diagram illustrating modules (e.g., components) of a user wearable device 106, according to some example embodiments. The user wearable device 106 may include sensors 202, a display 204, a processor 206, and a storage device 208. For example, the user wearable device 106 may be a wearable computing device, a vehicle computer, a tablet computer, a navigational device, a portable media device, or a smart phone of a user. The user may be a human user (e.g., a human being), a machine user (e.g., a computer configured by a software program to interact with the user wearable device 106), or any suitable combination thereof (e.g., a human assisted by a machine or a machine supervised by a human).

The sensors 202 may include, for example, a proximity or location sensor (e.g., near field communication, GPS, Bluetooth, WiFi), an optical sensor (e.g., a camera), an orientation sensor (e.g., a gyroscope), an audio sensor (e.g., a microphone), or any suitable combination thereof. For example, the sensors 202 may include a rear facing camera and a front facing camera in the user wearable device 106. It is noted that the sensors described herein are for illustration purposes only and the sensors 202 are thus not limited to the ones described. The sensors 202 may be configured to capture video and audio.

The display 204 may include, for example, a touchscreen display configured to receive user input via a contact on the touchscreen display. In one example, the display 204 may include a screen or monitor configured to display images generated by the processor 206. In another example, the display 204 may be transparent or semi-opaque so that the user can see through the display 204 (e.g., a Head-Up Display).

The processor 206 may include a broadcast application 210 and a display application 212. The broadcast application 210 may be configured to communicate data from the user wearable device 106 to the remote expert server 112. For example, the broadcast application 210 may include a video frame feed module 214 and a location/orientation module 216. The video frame feed module 214 may be configured to send images and/or video frames captured using the camera from sensors 202. In another example, the video frame feed module 214 may be used to send a video feed based on video captured using the sensors 202. The location/orientation module 216 may be configured to determine the geographic location and the orientation of the user wearable device 106. The geographic location may be determined using GPS, WiFi, audio tone, light reading, and other means. The orientation may be determined using an internal compass and an accelerometer in the user wearable device 106 to determine where the user wearable device 106 is located and in which direction the user wearable device 106 is oriented.

The display application 212 may be configured to generate augmented data in the display 204. The augmented data may include, for example, virtual objects renderings. In one embodiment, the display application 212 may include an augmented reality (AR) rendering module 218 and a remote expert module 224.

The AR rendering module 218 may be configured to generate a virtual object in the display 204. The AR rendering module 218 may include a local rendering engine that generates a visualization of a three-dimensional virtual object overlaid on (e.g., superimposed upon, or otherwise displayed in tandem with) an image of a physical object captured by a camera of the user wearable device 106 in the display 204 of the user wearable device 106. For example, the virtual object may include virtual knobs located on a physical door to illustrate where the knob is to be installed. In another example, the virtual object may include colored wiring schematics. The visualization of the three-dimensional virtual object may be manipulated by adjusting a position of the physical object (e.g., its physical location, orientation, or both) relative to the camera of the user wearable device 106. Similarly, the visualization of the three-dimensional virtual object may be manipulated by adjusting a position of a camera of the user wearable device 106 relative to the physical object.

In one example embodiment, the AR rendering module 218 may retrieve three-dimensional models of virtual objects associated with a captured real-world physical object. For example, the captured image may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object).

In one example embodiment, the AR rendering module 218 may include a manipulation module that identifies the physical object (e.g., a physical telephone), accesses virtual functions (e.g., increasing or decreasing the volume of a nearby television) associated with physical manipulations of the physical object (e.g., lifting a physical telephone handset), and generates a virtual function corresponding to a physical manipulation of the physical object.

The remote expert module 224 may allow the user of the user wearable device 106 to request assistance related to the physical object 102. For example, if the user needs help in fixing or studying the physical object 102, the remote expert module 224 may communicate with the remote expert server 112 to seek assistance from an expert related to the physical object 102. The remote expert module 224 may communicate data, including a video feed of the physical object 102 and virtual objects rendered by the AR rendering module 218, to the remote expert server 112. The remote expert server 112 may relay the information to the corresponding expert wearable device 108. Furthermore, the remote expert module 224 may modify a visualization of the virtual objects based on identified manipulations of the virtual objects from the expert wearable device 108. For example, the expert may modify or add a virtual object to highlight a particular area of the physical object 102. The expert wearable device 108 may communicate the modified or added virtual object to the remote expert module 224 via the remote expert server 112.

In another example, the virtual objects generated by the AR rendering module 218 are shared and any modification of the virtual objects may be synchronized and shared between the user wearable device 106 and the expert wearable device 108.

The storage device 208 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the user wearable device 106 relative to the picture of the shoe. Features of the three-dimensional virtual shoe may include selectable icons on the three-dimensional virtual model of the shoe. An icon may be selected or activated by tapping or moving on the user wearable device 106.

In one example embodiment, the storage device 208 may store a three-dimensional model of the physical object 102. For example, the three-dimensional model may include a three-dimensional model of a finished boat. The wearable device can present a user with a view of the final product superimposed on an image of the physical object 102 captured by the wearable device.

In another example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of the most popular images determined by the remote expert server 112. For example, the core set of images may include images depicting covers of the ten most popular magazines and their corresponding experiences (e.g., virtual objects that represent the ten most popular magazines). In another example, the remote expert server 112 may generate the core set of images based on the most popular or often scanned images received by the remote expert server 112. Thus, the primary content dataset does not depend on objects or images scanned by the sensors 202 of the user wearable device 106.

The contextual content dataset includes, for example, a second set of images and corresponding experiences (e.g., three-dimensional virtual object models) retrieved from the remote expert server 112. For example, images captured with the user wearable device 106 that are not recognized in the primary content dataset are submitted to the remote expert server 112 for recognition. If the captured image is recognized by the remote expert server 112, a corresponding experience may be downloaded by the user wearable device 106 and stored in the contextual content dataset. Thus, the contextual content dataset relies on the context in which the user wearable device 106 has been used. As such, the contextual content dataset depends on objects or images scanned by the AR rendering module 218 of the user wearable device 106.

Any one or more of the modules described herein may be implemented using hardware (e.g., a processor of a machine) or a combination of hardware and software. For example, any module described herein may configure a processor to perform the operations described herein for that module.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
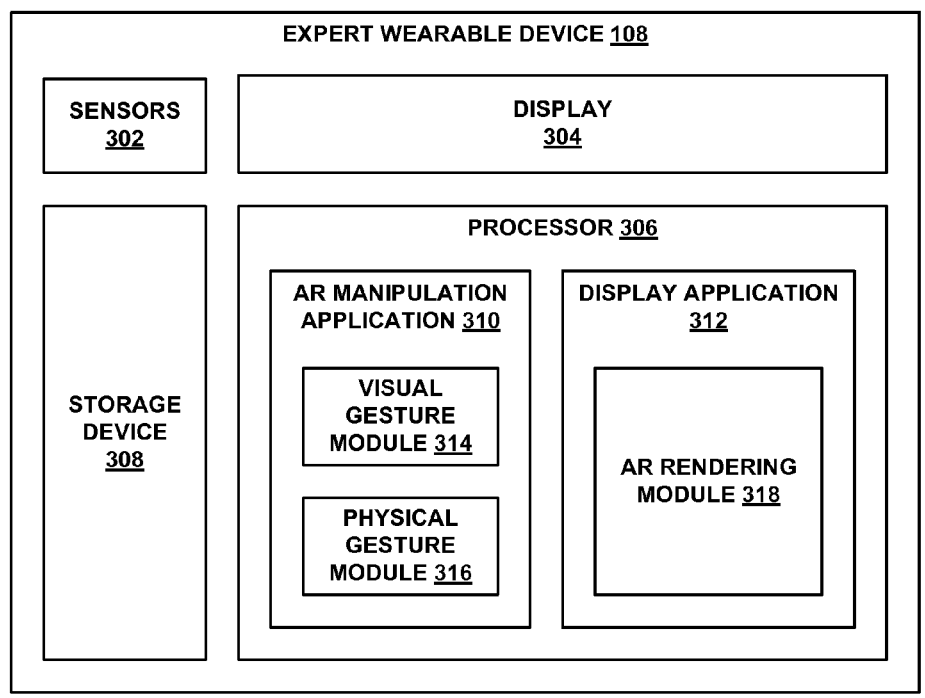
FIG. 3 is a block diagram illustrating an example embodiment of modules (e.g., components) of an expert wearable device.

FIG. 3 is a block diagram illustrating modules (e.g., components) of an expert wearable device 108, according to some example embodiments. The expert wearable device 108 may include sensors 302, a display 304, a processor 306, and a storage device 308. For example, the expert wearable device 108 may be a wearable computing device, a vehicle computer, a tablet computer, a navigational device, a portable media device, or a smart phone of a user. The user may be a human user (e.g., a human being), a machine user (e.g., a computer configured by a software program to interact with the expert wearable device 108), or any suitable combination thereof (e.g., a human assisted by a machine or a machine supervised by a human).

The sensors 302 may be similar to the sensors 202 of FIG. 2. The display 304 may be similar the display 204 of FIG. 2.

The processor 306 may include an AR manipulation application 310 and a display application 312. The AR manipulation application 310 may be configured to identify gestures made by the user of the expert wearable device 108. For example, gestures may include predefined motions of the user's extremities (arms, fingers) or predefined motions of the expert wearable device 108 (shaking left to right, tilting, moving up, looking down, etc). The gestures may be used to signify manipulation of the virtual objects, such as moving, rotating, or changing the orientation of a virtual object. The AR manipulation application 310 may record the manipulation of the virtual objects. The AR manipulation application 310 may include a visual gesture module 314 and a physical gesture module 316. The visual gesture module 314 may be used to interpret gesture using focus areas of the display 304. In one embodiment, the visual gesture module 314 determines a focus area in the display 304 and a feature of the virtual object, and changes a state of the feature in response to the feature being in the focus area of the display of the expert wearable device 108. For example, the top of a virtual box may be viewed so that it is positioned in the center of the display 304, where the center may be defined as a focus area. If the user of the expert wearable device 108 stares at the top of the virtual box for more than five seconds, the virtual box may open as a result of the top of the virtual box being in the focus area for more than a predefined amount of time.

The physical gesture module 316 identifies a physical movement of, for example, a finger of a user of the expert wearable device 108 relative to the virtual objects displayed in the expert wearable device 108. For example, as the user views the virtual objects, he may use his finger to manipulate and move the virtual objects by placing his fingers/hands "on top" of the virtual objects. The physical gesture module 316 may determine that the user may wish to move, change, or rotate based on, for example, the placement of the fingers of the user. Other physical gestures may include waving hands, or moving a hand in a particular pattern or direction.

The display application 312 may be configured to generate augmented data in the display 304. The augmented data may include the virtual objects as viewed by the user wearable device 106. In one embodiment, the display application 312 may include an augmented reality (AR) rendering module 318 similar to the AR rendering module 218 of FIG. 2.

In one example embodiment, the AR rendering module 318 may retrieve three-dimensional models of virtual objects in relation to a reference object 104 that may be different from the physical object 102. For example, the reference object 104 may be associated with the physical object 102 and may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object).

The storage device 308 may be similar to the storage device 208 of FIG. 2. The storage device 308 may store a recording of the manipulation of the virtual objects as identified using the AR manipulation application 310.

Figure 4:
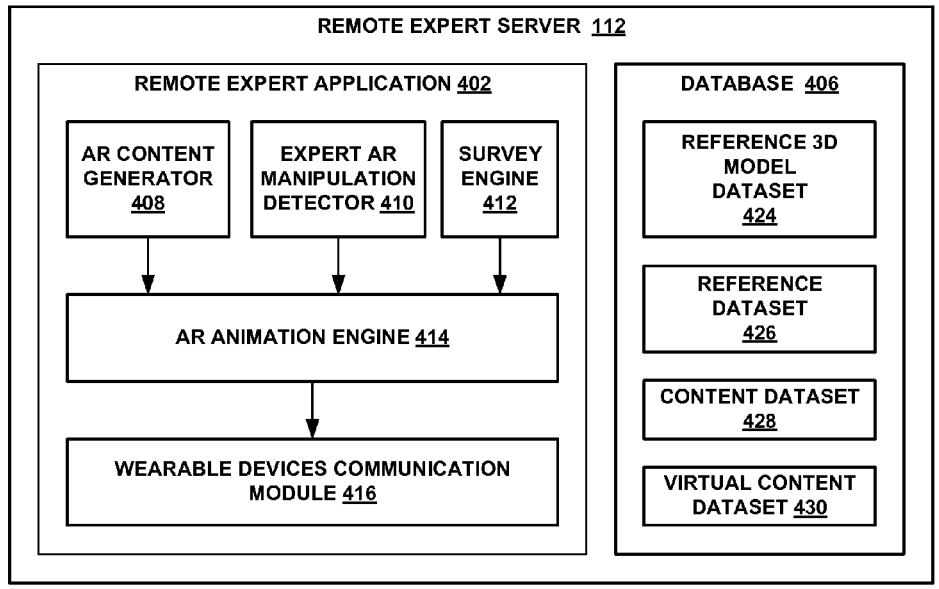
FIG. 4 is a block diagram illustrating an example embodiment of a remote expert server.

FIG. 4 is a block diagram illustrating modules (e.g., components) of the remote expert server 112. The remote expert server 112 includes a remote expert application 402 and a database 406.

The remote expert application 402 may include an AR content generator 408, an expert AR manipulation detector 410, a survey engine 412, an AR animation engine 414, and a wearable devices communication module 416.

The AR content generator 408 generates three-dimensional models of virtual objects based on the physical object 102 viewed by the user wearable device 106. The AR content generator 408 may generate a model of a virtual object to be rendered in the display 204 of the user wearable device 106 based on a position of the user wearable device 106 relative to the physical object 102. A physical movement of the physical object 102 is identified from an image captured by the user wearable device 106. The AR content generator 408 may also determine a virtual object corresponding to the tracking data (either received from the user wearable device 106 or generated externally to the user wearable device 106) and render the virtual object. Furthermore, the tracking data may identify a real-world object being looked at by the user of the user wearable device 106. The virtual object may include a manipulable virtual object or displayed augmented information associated with such. A virtual object may be manipulable based on the user's interaction with the physical object 102. For example, the user may view the physical object and the virtual object from a viewing device (e.g., a tablet, a helmet, eyeglasses) and manipulate the virtual object by moving the viewing device around, closer, or father from the physical object 102. In another example, the user may manipulate the virtual object via a touchscreen of the viewing device. For example, the user may rotate a view of the virtual object by swiping the touchscreen.

The expert AR manipulation detector 410 identifies the manipulation of the virtual objects by the expert wearable device 108 and communicates with the AR manipulation application 310 of the expert wearable device 108.

The survey engine 412 may be configured to map and survey the physical object 102 so as to provide a dynamic or real time status related to the physical object 102. For example, the combined data from construction workers each having the user wearable device 106 at a shipyard may be used to reconstruct a three-dimensional model of the ship or boat they are building. The three-dimensional model may be rendered at the remote expert server 112 and provided to the monitoring client 114. Thus, an architect may see a dynamic 3D model of the ship being built. The 3D model may be rendered and provided as augmented information to the wearable devices. Furthermore, the data from the wearable devices may be used for object recognition and object tracking so as generate a dynamic status of who is working on what part of the ship, where they are, where the tools are, when they were last used, and whether the construction workers complied with the specifications or codes.

The AR animation engine 414 generates an animation of the AR content manipulation as detected by the expert AR manipulation detector 410. The AR animation engine 414 generates a visualization of the manipulation of the virtual objects for display in another wearable device. For example, the expert may move virtual objects to show how to disassemble parts of an air conditioning unit. The AR animation engine 414 may record the movement of the virtual objects and generate an animation based on the movement of the virtual objects.

The wearable devices communication module 416 communicates with both the AR rendering module 218 of the user wearable device 106 and the AR manipulation application 310 of the expert wearable device 108. In one embodiment, the wearable devices communication module 416 may stream a portion of the rendered virtual object and let the user wearable device 106 render the remaining portions of the virtual object that are not rendered or sent by the remote expert server 112.

The database 406 may store a reference 3D model dataset 424, a reference dataset 426, a content dataset 428, and a virtual content dataset 430. The reference dataset 426 may include references related to the physical object 102. The reference 3D model dataset 424 may include a 3D model of the completed physical object 102 and other objects related to the physical object 102. For example, the reference 3D model dataset 424 may include a 3D model of a completed ship, machine, or building. The reference dataset 426 may include, for example, building codes, schematics, maps, wiring diagrams, building processes, inventory lists of materials, specifications of building materials, descriptions of tools used in the processes related to the construction of a building, and information about the expertise of each construction worker.

The content dataset 428 may store a primary content dataset and a contextual content dataset. The primary content dataset comprises a first set of images and corresponding virtual object models. The survey engine 412 determines that a captured image received from the user wearable device 106 is not recognized in the content dataset 428, and generates the contextual content dataset for the user wearable device 106. The contextual content dataset may include a second set of images and corresponding virtual object models. The virtual content dataset 430 includes models of virtual objects to be generated upon receiving a notification associated with an image of a corresponding physical object.

Figure 5:
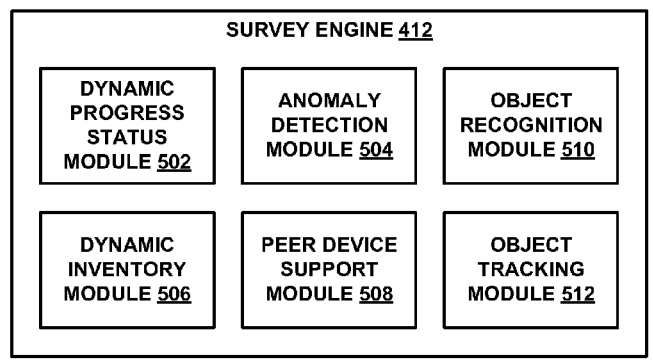
FIG. 5 is a block diagram illustrating an example embodiment of a survey engine.

FIG. 5 illustrates an example embodiment of the survey engine 412. The survey engine 412 may include a dynamic progress status module 502, an anomaly detection module 504, an object recognition module 510, a dynamic inventory module 506, a peer device support module 508, and an object tracking module 512.

The dynamic progress status module 502 may be configured to determine the status of an activity related to one or more wearable devices. For example, the dynamic progress status module 502 may determine that phase 2 of a project is completed based on the detection by the wearable devices that all nails have been placed in the corresponding areas. The dynamic progress status module 502 may use other parameters besides object or activity detection to determine the phase of a project. For example, if all wearable devices are located in key locations designated for protection from building blast, the dynamic progress status module 502 can infer that the construction phase relates to building demolition.

The anomaly detection module 504 may be configured to detect anomalies based on the data from the wearable devices and the reference data. The anomaly detection module 504 may monitor compliance of actions and objects detected by the wearable devices. For example, the anomaly detection module 504 may detect that some wirings are missing or that an outlet is missing from a wall and thus the installation does not conform to the architectural specifications or building codes. In another example, if a jack hammer is to be used at site A, and the anomaly detection module 504 determines that the recognized jack hammer is being used at site B, the anomaly detection module 504 may generate and issue an alert to the wearable devices. In yet another example, the anomaly detection module 504 detects that only five nails have been used instead of the prescribed ten nails as specified in a building code or an architectural plan. Once the anomaly is detected and identified, the anomaly detection module 504 generates an alert to the wearable device(s) corresponding to the five nails in the wall.

The object recognition module 510 performs object recognition algorithms on the video feeds and image feeds to identify objects captured by the wearable devices. The object tracking module 512 may be configured to track the recognized object. For example, the object recognition module 510 identifies a hammer and the object tracking module 512 tracks the movements of the hammer used, for example, in hammering a panel.

The dynamic inventory module 506 generates a real time or dynamic inventory of recognized objects and manipulations of recognized objects from the video feeds. The dynamic inventory module 506 further associates a wearable device with the recognized objects and manipulations. For example, the dynamic inventory module 506 may keep track of where a hammer is located, who used the hammer, and when the hammer was used. The dynamic inventory module 506 may include a history of the inventory so that the monitoring client 114 can inquire into the historical status of the hammer or the wearable devices. For example, a user can query the dynamic inventory module 506 to identify who did what at a particular point in time.

The peer device support module 508 may be configured to enable communication between the wearable devices. For example, the peer device support module 508 may connect a wearable device to another wearable device based on their users' task similarity or expertise.

Figure 6:
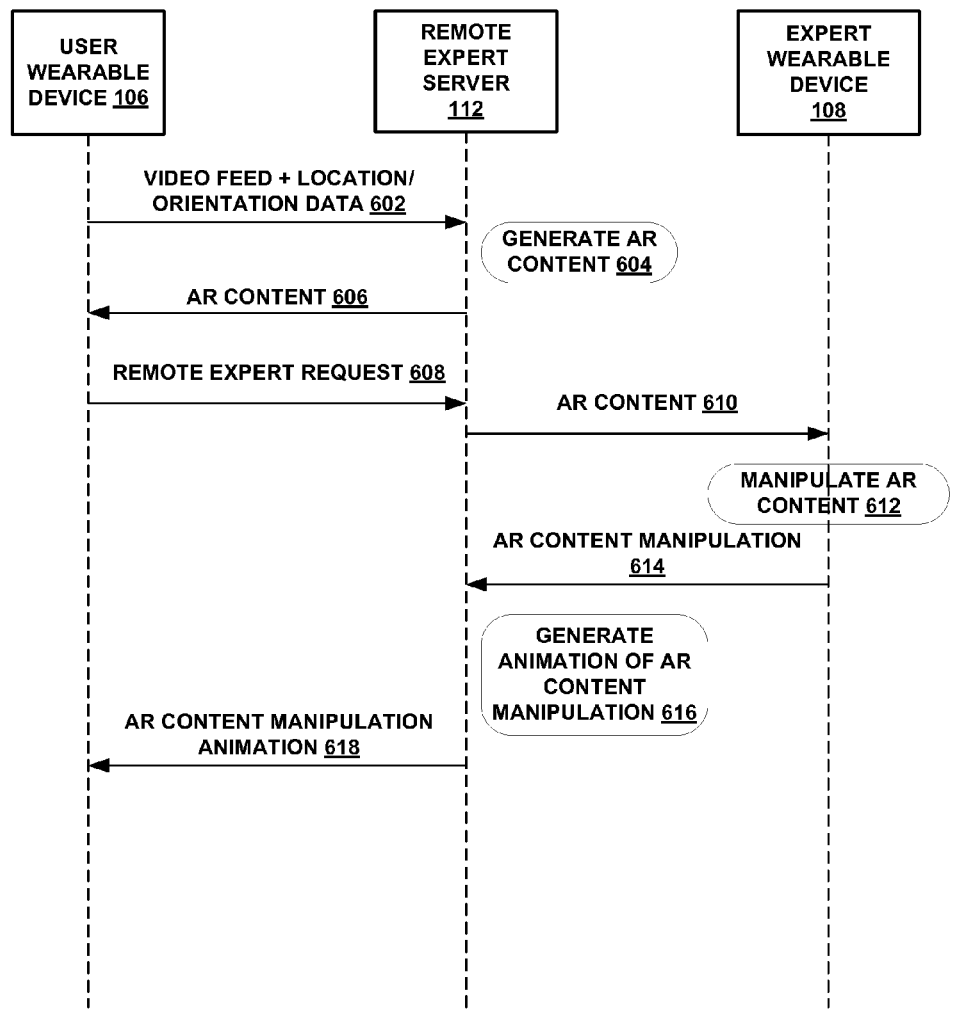
FIG. 6 is a ladder diagram illustrating an example embodiment of an operation of the remote expert server.

FIG. 6 is a ladder diagram illustrating an example embodiment of operating the remote expert server 112. At operation 602, the user wearable device 106 communicates data including video feed, location, and orientation to the remote expert server 112. At operation 604, the remote expert server 112 generates AR content based on the data received from the user wearable device 106. At operation 606, the remote expert server 112 sends the AR content to the user wearable device 106. At operation 608, the user wearable device 106 sends a request for a remote expert to remote expert server 112. At operation 610, the remote expert server 112 sends the same AR content to the expert wearable device 108. At operation 612, the expert wearable device 108 manipulates the AR content. At operation 614, the expert wearable device 108 sends the AR content manipulation to the remote expert server 112. At operation 616, the remote expert server 112 generates an animation of the AR content manipulation, and at operation 618 the remote expert server 112 sends the AR content manipulation animation to the user wearable device 106.

Figure 7:
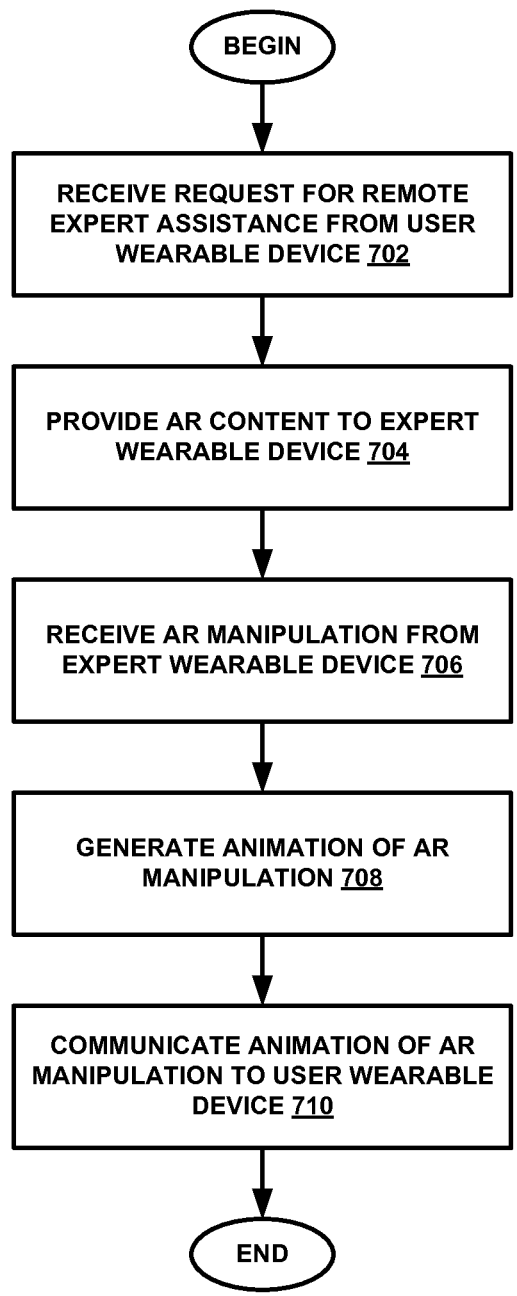
FIG. 7 is a flowchart illustrating an example embodiment of an operation of the remote expert server.

FIG. 7 is a flowchart illustrating an example embodiment of operating the remote expert server 112. At operation 702, the remote expert server 112 receives, from the user wearable device 106, data including video feed, location, and orientation, and a request for a remote expert. The remote expert server 112 identifies a user with known technical expertise related to an anomaly of a physical object. For example, if the anomaly is incorrectly placed electrical wiring, a user with electrical expertise may be identified based on the detected electrical anomaly. The remote expert server 112 enables communications between the wearable devices of the identified expert and of the user with the identified anomaly. At operation 704, the remote expert server 112 provides AR content to the expert wearable device 108. At operation 706, the remote expert server 112 receives from the expert wearable device 108 an AR content manipulation. At operation 708, the remote expert server 112 generates an animation of the AR content manipulation, and at operation 710 the remote expert server 112 sends the animation to the user wearable device 106.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
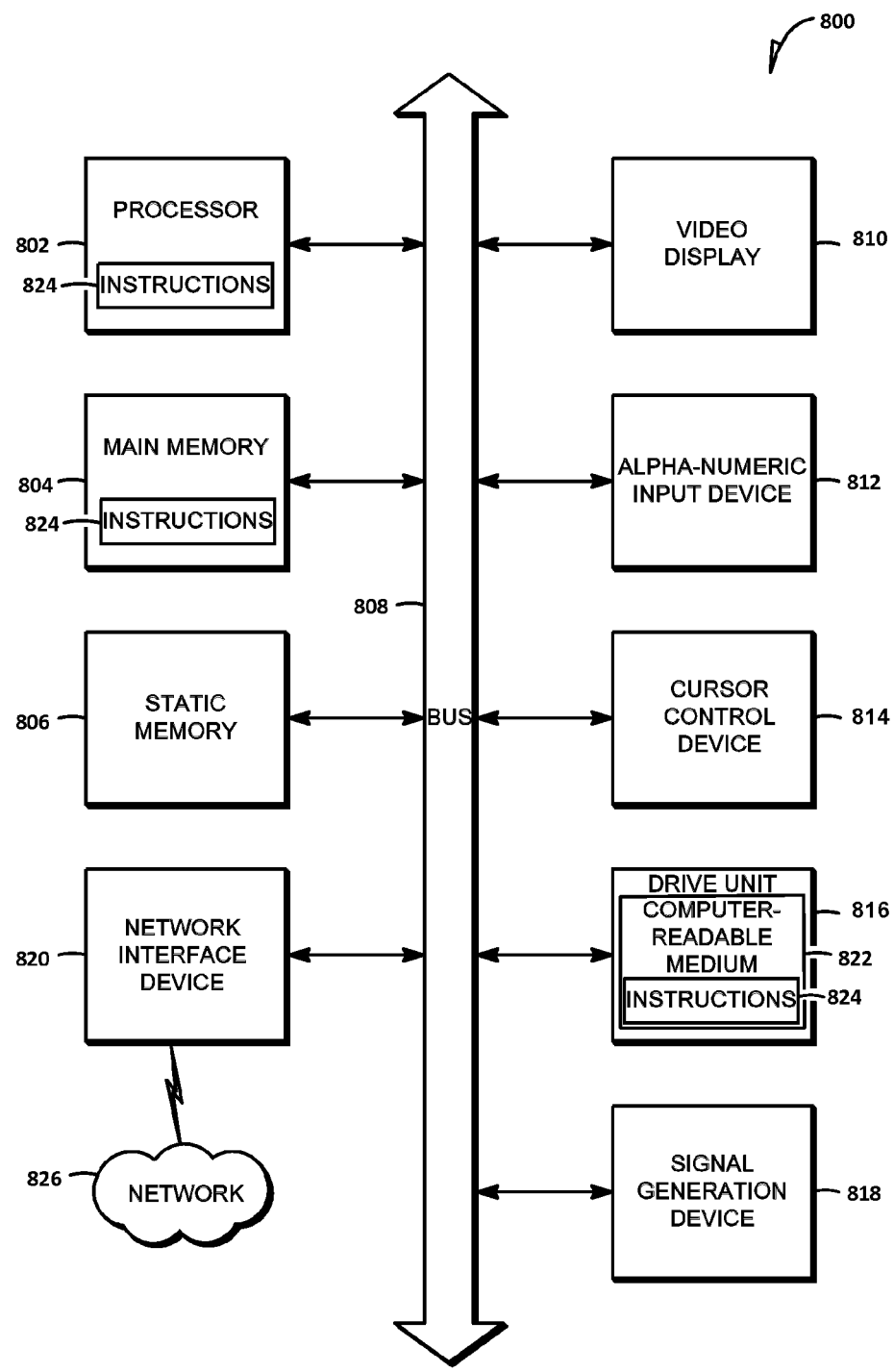
FIG. 8 is a block diagram illustrating components of a machine, according to some example embodiments, able to read instructions from a machine-readable medium and perform any one or more of the methodologies discussed herein.

FIG. 8 is a block diagram of a machine in the example form of a computer system 800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a remote expert server 112 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a drive unit 816, a signal generation device 818 (e.g., a speaker) and a network interface device 820.

Machine-Readable Medium

The drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions 824 for execution by the machine and that cause the machine to perform any one or more of the methodologies of the present embodiments, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disk read-only memory (CD-ROM) and digital versatile disk (or digital video disk) read-only memory (DVD-ROM) disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 824 for execution by the machine, and includes digital or analog communications signals or other intangible media to facilitate communication of such software.

Example Mobile Device

Figure 9:
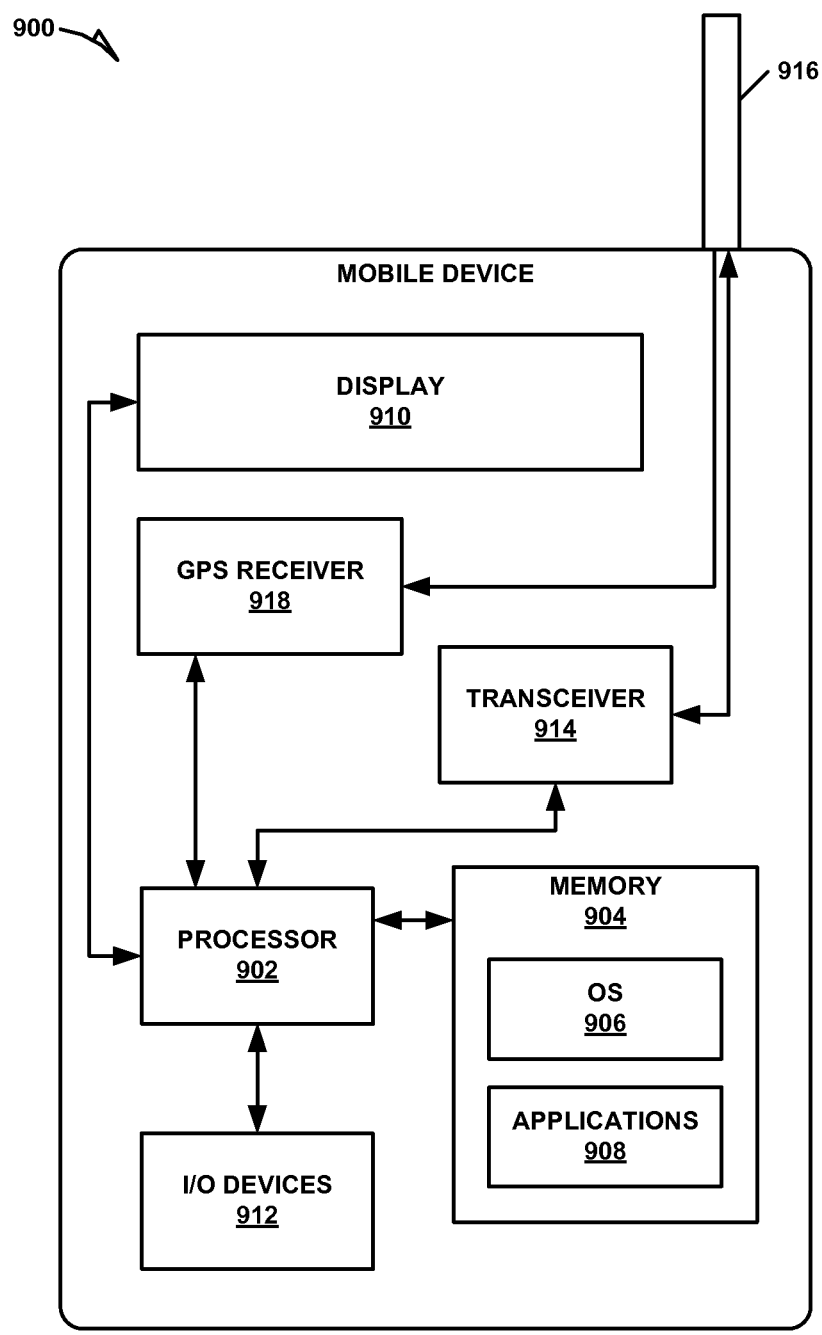
FIG. 9 is a block diagram illustrating a mobile device, according to an example embodiment.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide location-based services (LBSs) to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
one or more computer processors; and
one or more computer-readable mediums storing instructions that, when executed by the one or more computer processors, cause the system to perform operations comprising:
receiving, from a first wearable device, data including a video feed captured by the first wearable device, the video feed depicting to a physical object viewed with the first wearable device;
comparing the data received from the first wearable device to a three dimensional (3D) model dataset of the physical object, yielding a comparison;
identifying, based on the comparison, an anomaly between the physical object viewed with the first wearable device and the 3D model dataset of the physical object;
identifying, based on the anomaly, a user designated as an expert related to the anomaly;
providing, to a second wearable device used by the user designated as the expert related to the anomaly, virtual objects displayed by the first wearable device, causing the second wearable device to present the virtual objects to the user designated as the expert;
receiving, from the second wearable device, data describing a manipulation of the virtual objects displayed by the second wearable device, the virtual objects displayed in the first wearable device in relation to a reference object viewed with the first wearable device;
generating a visualization of the manipulation of the virtual objects from the second wearable device; and
communicating the visualization of the manipulation of the virtual objects to the first wearable device, causing the first wearable device to present the visualization of the manipulation to a user of the first wearable device.

2. The system of claim 1, the operations further comprising:
identifying the physical object from the video feed;
generating a 3D model of the virtual objects based on the identification of the physical object; and
communicating the 3D model of the virtual objects to the first wearable device, the first wearable device being configured to render the 3D model of the virtual objects in relation to the physical object.

3. The system of claim 1, the operations further comprising recording the manipulation of the virtual objects from the second wearable device.

4. The system of claim 1, wherein the manipulation of the virtual objects is determined by the second wearable device using a visual gesture module, the visual gesture module configured to determine a predefined area of a display of the second wearable device and a feature of the virtual objects, and to change a state of the feature in response to the feature being in the predefined area of the display of the second wearable device.

5. The system of claim 1, wherein the manipulation of the virtual objects is determined by the second wearable device using a physical gesture module, the physical gesture module configured to determine a physical movement of a finger of the user of the second wearable device relative to the virtual objects displayed by the second wearable device.

6. The system of claim 1, wherein the visualization includes an animation of the manipulation of the virtual objects.

7. The system of claim 1, the operations further comprising:

receiving, from the first wearable device, a subsequent manipulation of the virtual objects; and communicating a visualization of the subsequent manipulation of the virtual objects to the second wearable device, causing the second wearable device to present the subsequent manipulation to the user designated as the expert.

8. The system of claim 1, the operations further comprising:

receiving video feeds from a plurality of wearable devices, the video feeds depicting the physical object;

generating a 3D model of the physical object based on the video feeds received from the plurality of wearable devices; and updating the 3D model of physical object based on manipulations of the physical object identified from the video feeds.

9. A method comprising:

receiving, from a first wearable device, data including a video feed captured by the first wearable device, the video feed depicting a physical object viewed with the first wearable device;

comparing the data received from the first wearable device to a three dimensional (3D) model dataset of the physical object, yielding a comparison;

identifying, based on the comparison, an anomaly between the physical object viewed with the first wearable device and the 3D model dataset of the physical object;

identifying, based on the anomaly, a user designated as an expert related to the anomaly;

providing, to a second wearable device used by the user designated as the expert related to the anomaly, virtual objects displayed by the first wearable device, causing the second wearable device to present the virtual objects to the user designated as the expert;

receiving, from the second wearable device, data describing a manipulation of the virtual objects displayed by the second wearable device, the virtual objects displayed in the first wearable device in relation to a reference object viewed with the first wearable device;

generating a visualization of the manipulation of the virtual objects from the second wearable device; and communicating the visualization of the manipulation of the virtual objects to the first wearable device, causing the first wearable device to present the visualization of the manipulation to a user of the first wearable device.

10. The method of claim 9, further comprising:

identifying the physical object from the video feed;

generating a 3D model of the virtual objects based on the identification of the physical object; and communicating the 3D model of the virtual objects to the first wearable device, the first wearable device being configured to render the 3D model of the virtual objects in relation to the physical object.

11. The method of claim 9, further comprising:

recording the manipulation of the virtual objects from the second wearable device.

12. The method of claim 9, wherein the manipulation of the virtual objects is determined by the second wearable device using a visual gesture module, the visual gesture module configured to determine a predefined area of a display of the second wearable device and a feature of the virtual objects, and to change a state of the feature in response to the feature being in the predefined area of the display of the second wearable device.

13. The method of claim 9, wherein the manipulation of the virtual objects is determined by the second wearable device using a physical gesture module, the physical gesture module configured to determine a physical movement of a finger of the user of the second wearable device relative to the virtual objects displayed by the second wearable device.

14. The method of claim 9, wherein the visualization includes an animation of the manipulation of the virtual objects.

15. The method of claim 9, the method further comprising:

receiving, from the first wearable device, a subsequent manipulation of the virtual objects; and communicating a visualization of the subsequent manipulation of the virtual objects to the second wearable device, causing the second wearable device to present the subsequent manipulation to the user designated as the expert.

16. The method of claim 9, further comprising:

receiving video feeds from a plurality of wearable devices, the video feeds depicting the physical object;

generating a 3D model of the physical object based on the video feeds received from the plurality of wearable devices; and updating the 3D model of the physical object based on manipulations of the physical object identified from the video feeds.

17. A non-transitory machine-readable medium comprising instructions that, when executed by one or more processors of a machine, cause the machine to perform operations comprising:

receiving, from a first wearable device, data including a video feed captured by the first wearable device, the video feed depicting a physical object viewed with the first wearable device;

comparing the data received from the first wearable device to a three dimensional (3D) model dataset of the physical object, yielding a comparison;

identifying, based on the comparison, an anomaly between the physical object viewed with the first wearable device and the 3D model dataset of the physical object;

identifying, based on the anomaly, a user designated as an expert related to the anomaly;

providing, to a second wearable device used by the user designated as the expert related to the anomaly, virtual objects displayed by the first wearable device, causing the second wearable device to present the virtual objects to the user designated as the expert;

receiving, from the second wearable device, data describing a manipulation of the virtual objects displayed by the second wearable device, the virtual objects displayed in the first wearable device in relation to a reference object viewed with the first wearable device;

generating a visualization of the manipulation of the virtual objects from the second wearable device; and communicating the visualization of the manipulation of the virtual objects to the first wearable device, causing the first wearable device to present the visualization of the manipulation to a user of the first wearable device.

* * * * *

UNITED STATES PATENT AND TRADEMARK OFFICE
CERTIFICATE OF CORRECTION

PATENT NO. : 9,665,985 B2
APPLICATION NO. : 14/461252
DATED : May 30, 2017
INVENTOR(S) : Mullins et al.

It is certified that error appears in the above-identified patent and that said Letters Patent is hereby corrected as shown below:

In the Claims

In Column 20, Line 10, in Claim 1, after "depicting", delete "to"

Signed and Sealed this
Eleventh Day of June, 2019

Andrei Iancu
*Director of the United States Patent and Trademark Office*